United States Patent
Almutairi et al.

(10) Patent No.: US 12,503,737 B2
(45) Date of Patent: Dec. 23, 2025

(54) SUSTAINABLE STEEL PRODUCTION WITH CO-GENERATION OF HYDROGEN

(71) Applicant: Saudi Arabian Oil Company, Dhahran (SA)

(72) Inventors: Faisal B. Almutairi, Dammam (SA); Ali Abdulaziz Al-Ugla, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 457 days.

(21) Appl. No.: 18/295,050

(22) Filed: Apr. 3, 2023

(65) Prior Publication Data

US 2024/0327939 A1    Oct. 3, 2024

(51) Int. Cl.
*F01K 17/02*    (2006.01)
*C21B 13/00*    (2006.01)
(Continued)

(52) U.S. Cl.
CPC ............ *C21C 7/00* (2013.01); *C21B 13/0073* (2013.01); *C21C 5/5252* (2013.01); *F01K 17/02* (2013.01);
(Continued)

(58) Field of Classification Search
CPC ..... C21C 7/00; C21C 5/5252; C21C 2300/08; C21B 13/0073; C21B 2300/02;
(Continued)

(56) References Cited

U.S. PATENT DOCUMENTS

| 4,055,948 A | 11/1977 | Kraus |
| 4,201,924 A | 5/1980 | Uram |

(Continued)

FOREIGN PATENT DOCUMENTS

| CN | 102454440 | 4/2015 |
| CN | 108626083 | 10/2018 |

(Continued)

OTHER PUBLICATIONS

Asim et al., "Sustainability of Heating, Ventilation and Air-Conditioning (HVAC) Systems in Buildings—An Overview," International Journal of Environmental Research and Public Health, Jan. 2022, 19(1016):1-16, 16 pages.

(Continued)

*Primary Examiner* — Matthew T Largi
(74) *Attorney, Agent, or Firm* — Fish & Richardson P.C.

(57) ABSTRACT

Solar energy is concentrated and transferred to a heat transfer fluid, thereby heating the heat transfer fluid. The heat transfer fluid includes solid particles. Heat from the heat transfer fluid is used to melt a metal. While transferring heat to the furnace, at least a portion of the melted metal is oxidized to form steel. Heat is transferred from a first portion of the heat transfer fluid to a working fluid. The working fluid is then flowed through a turbine generator, which generates electrical power in response. A first water stream is electrolyzed using the electrical power generated by the turbine generator to produce a first oxygen stream and a first hydrogen stream. Heat is transferred from a second portion of the heat transfer fluid to a reactor that houses a recycling agent to thermochemically split a second water stream into a second oxygen stream and a second hydrogen stream.

18 Claims, 3 Drawing Sheets

(51) Int. Cl.
  *C21C 5/52* (2006.01)
  *C21C 7/00* (2006.01)
  *F01K 23/06* (2006.01)
  *F24S 20/20* (2018.01)
  *F24S 20/30* (2018.01)
(52) U.S. Cl.
  CPC ............ *F01K 23/064* (2013.01); *F24S 20/20* (2018.05); *F24S 20/30* (2018.05); *C21B 2300/02* (2013.01); *C21C 2300/08* (2013.01)
(58) Field of Classification Search
  CPC ........ F01K 17/02; F01K 23/064; F24S 20/20; F24S 20/30
  See application file for complete search history.

(56) References Cited

U.S. PATENT DOCUMENTS

| | | | |
|---|---|---|---|
| 5,925,223 | A | 7/1999 | Simpson et al. |
| 6,044,640 | A | 4/2000 | Guimaraes |
| 6,833,056 | B1 | 12/2004 | Kamiya et al. |
| 8,051,637 | B2 | 11/2011 | Labrador |
| 8,109,265 | B1* | 2/2012 | Kolb ........ F24S 20/20 126/714 |
| 8,544,526 | B2 | 10/2013 | Sudau et al. |
| 9,488,394 | B1 | 11/2016 | El-Shaarawi et al. |
| 9,651,313 | B2 | 5/2017 | Trainham et al. |
| 9,702,597 | B1 | 7/2017 | El-Shaarawi et al. |
| 9,784,484 | B2 | 10/2017 | El-Shaarawi et al. |
| 9,835,361 | B2 | 12/2017 | El-Shaarawi et al. |
| 10,041,707 | B2 | 8/2018 | El-Shaarawi et al. |
| 10,060,296 | B2 | 8/2018 | Friesth |
| 10,634,399 | B2 | 4/2020 | El-Shaarawi et al. |
| 10,634,400 | B2 | 4/2020 | El-Shaarawi et al. |
| 11,131,482 | B1* | 9/2021 | Al-Ugla ........ F01K 17/02 |
| 2004/0045682 | A1 | 3/2004 | Liprie |
| 2005/0120715 | A1 | 6/2005 | Labrador |
| 2007/0084208 | A1 | 4/2007 | Goldman |
| 2008/0155985 | A1 | 7/2008 | Labrador |
| 2009/0064680 | A1* | 3/2009 | Ustun ........ F03G 6/071 60/416 |
| 2009/0313886 | A1 | 12/2009 | Hinman et al. |
| 2010/0319348 | A1 | 12/2010 | Jones et al. |
| 2012/0240577 | A1 | 9/2012 | Mandelberg |
| 2013/0014508 | A1 | 1/2013 | Brooks |
| 2013/0207402 | A1 | 8/2013 | Bronicki |
| 2013/0300038 | A1 | 11/2013 | Ose et al. |
| 2014/0075939 | A1 | 3/2014 | Aga et al. |
| 2015/0143806 | A1 | 5/2015 | Friesth |
| 2015/0167500 | A1* | 6/2015 | Backes ........ F02C 6/04 700/295 |
| 2015/0267689 | A1* | 9/2015 | Zillmer ........ F03G 6/067 126/714 |
| 2017/0130998 | A1 | 5/2017 | El-Shaarawi et al. |
| 2017/0159975 | A1* | 6/2017 | Krause ........ C04B 35/62884 |
| 2018/0347406 | A1 | 12/2018 | Friesth |
| 2019/0323384 | A1 | 10/2019 | Uechi et al. |
| 2022/0268488 | A1* | 8/2022 | Brewer ........ F24S 20/20 |
| 2023/0152008 | A1* | 5/2023 | Brewer ........ F24S 50/40 126/569 |
| 2024/0279079 | A1 | 8/2024 | Almutairi et al. |

FOREIGN PATENT DOCUMENTS

| | | |
|---|---|---|
| CN | 115218247 | 10/2022 |
| DE | 102011090094 | 7/2013 |
| EP | 2941475 | 6/2019 |
| JP | 2012083025 | 4/2012 |
| WO | WO 2010138597 | 12/2010 |

OTHER PUBLICATIONS

Ferber et al., "Development of an electric arc furnace steel slag-based ceramic material for high temperature thermal energy storage applications," Journal of Energy Storage, Mar. 2022, 51:104408, 15 pages.

International Search Report and Written Opinion in International Appln. No. PCT/US2021/045404, mailed on Dec. 1, 2021, 15 pages.

McBrien et al., "Potential for energy savings by heat recovery in an integrated steel supply chain," Applied Thermal Engineering, 2016, 103:592-606, 15 pages.

Morozov, "Comparative Analysis of Hydrogen Production Methods with Nuclear Reactors," IYNC, Sep. 20-26, 2008, 237.1-237.11, 11 pages.

Wei et al., "The Comprehensive Understanding of 10 mA cmgeo-2 as an Evaluation Parameter for Electrochemical Water Splitting," Small Methods, Nov. 2018, 2(1800168):1-3, 3 pages.

Williams, "A Waste Heat Recovery Strategy for An Integrated Steelworks," Thesis for the degree of Doctor of Philosophy, Cardiff University, School of Engineering, Dec. 2015, 259 pages.

\* cited by examiner

SUSTAINABLE STEEL PRODUCTION WITH CO-GENERATION OF HYDROGEN

TECHNICAL FIELD

This disclosure relates to steel production.

BACKGROUND

Steel is an alloy of iron and carbon that exhibits improved strength and fracture resistance in comparison to other forms of iron. Because of its tensile strength, steel is widely used in buildings, infrastructure, tools, ships, trains, cars, machines, electrical appliances, and weapons across the world. The steel industry is one of the largest manufacturing industries in the world. With that, however, it is also one of the most energy intensive and greenhouse gas emitting industries, thereby contributing to about 10% of global emissions.

Hydrogen is the lightest element. At standard conditions, hydrogen is a gas of diatomic molecules and is colorless, odorless, tasteless, non-toxic, and combustible. Hydrogen is the most abundant chemical substance in the universe. Most of the hydrogen on Earth exists in molecular forms, such as in water and in organic compounds (such as hydrocarbons). Some examples of uses of hydrogen include fossil fuel processing (for example, hydrocracking) and ammonia production. Hydrogen is also an energy carrier.

There is a growing interest in the energy transition from fossil fuels to renewable energy and sustainable energy in a global effort to reduce carbon emissions. Some examples of decarbonization pathways in the energy transition to renewable energy include increasing energy efficiency, producing and/or using lower-carbon fuels, and carbon capture and storage (CCS).

SUMMARY

This disclosure describes technologies relating to steel production. Certain aspects of the subject matter described can be implemented as a system. The system includes a particle receiver, a furnace, a power generation unit, and a reactor. The particle receiver contains a heat transfer fluid. The heat transfer fluid includes a plurality of solid particles. The particle receiver is configured to receive and concentrate solar energy. The particle receiver is configured to transfer the concentrated solar energy to the heat transfer fluid to heat the heat transfer fluid. The furnace is coupled to the particle receiver. The furnace includes a housing. The housing is configured to receive a metal feedstock. The metal feedstock includes metal. The housing is configured to transfer heat from the heat transfer fluid to the metal feedstock to melt the metal. The housing includes an inlet port. The inlet port is configured to inject an oxidizing stream into the housing to oxidize at least a portion of the melted metal to form steel. The oxidizing stream includes oxygen. The power generation unit is downstream of the furnace. The power generation unit is configured to receive a first portion of the heat transfer fluid from the furnace. The power generation unit includes a heat exchanger and a turbine generator. The heat exchanger is configured to transfer heat from the first portion of the heat transfer fluid to a working fluid. The turbine generator is in fluid communication with the heat exchanger. The turbine generator is configured to receive the working fluid that has been heated by the heat exchanger. The turbine generator is configured to generate electrical power as the working fluid expands through the turbine generator. The electrolytic cell is electrically coupled to the turbine generator. The electrolytic cell is configured to receive a first water stream. The electrolytic cell is configured to utilize the electrical power generated by the turbine generator to electrolyze the first water stream into a first oxygen stream and a first hydrogen stream. The reactor is downstream of the furnace. The reactor includes a recycling agent. The reactor is configured to receive a second portion of the heat transfer fluid from the furnace. The reactor is configured to receive a second water stream. The reactor is configured to transfer heat from the second portion of the heat transfer fluid to the recycling agent and the second water stream to thermochemically split the second water stream into a second oxygen stream and a second hydrogen stream.

This, and other aspects, can include one or more of the following features. The plurality of solid particles of the heat transfer fluid can be made of a eutectic alloy. The eutectic alloy can include lead and bismuth. The particle receiver can be configured to transfer the concentrated solar energy to the heat transfer fluid to heat the heat transfer fluid to about 1,500 degrees Celsius (° C.). A mass ratio of the first portion of the heat transfer fluid to the second portion of the heat transfer fluid can be about 3:1. The electrolytic cell can be configured to receive the first portion of the heat transfer fluid from the heat exchanger. The electrolytic cell can be configured to transfer heat from the first portion of the heat transfer fluid to the first water stream to maintain an electrolysis operating temperature in the electrolytic cell in a range of from about 70° C. to about 850° C. The reactor can be configured to transfer heat from the second portion of the heat transfer fluid to the recycling agent and the second water stream to maintain a thermochemical water splitting operating temperature in the reactor in a range of from about 250° C. to about 1,400° C. The system can include a direct reduced iron production unit. The direct reduced iron production unit can be configured to receive, as a hydrogen source, the first hydrogen stream from the electrolytic cell, the second hydrogen stream from the reactor, or both. The direct reduced iron production unit can be configured to contact iron ore with the hydrogen source to reduce the iron ore into iron. At least a portion of the metal feedstock can be sourced from the iron produced by the direct reduced iron production unit. At least a portion of the oxidizing stream can be sourced from the first oxygen stream from the electrolytic cell, the second oxygen stream from the reactor, or both. The furnace can include a plurality of electrodes configured to generate an electric arc between the plurality of electrodes and the metal feedstock within the housing to melt the metal feedstock when sufficient solar energy is unavailable for heating the heat transfer fluid to about 1,500° C.

Certain aspects of the subject matter described can be implemented as a method. Solar energy is concentrated and transferred to a heat transfer fluid, thereby heating the heat transfer fluid. The heat transfer fluid includes a plurality of solid particles. After transferring solar energy to the heat transfer fluid, heat is transferred from the heat transfer fluid to a furnace that houses metal to melt the metal. While transferring heat to the furnace, an oxidizing stream is injected into the furnace to oxidize at least a portion of the melted metal to form steel. The oxidizing stream includes oxygen. After transferring heat to the furnace, heat is transferred from a first portion of the heat transfer fluid to a working fluid. After transferring heat to the working fluid, the working fluid is flowed through a turbine generator. The turbine generator generates electrical power in response to the working fluid flowing through the turbine generator. A first water stream is electrolyzed using the electrical power generated by the turbine generator to produce a first oxygen stream and a first hydrogen stream. After transferring heat to the furnace, heat is transferred from a second portion of the heat transfer fluid to a reactor that houses a recycling agent to thermochemically split a second water stream into a second oxygen stream and a second hydrogen stream.

This, and other aspects, can include one or more of the following features. The plurality of solid particles of the heat transfer fluid can be made of a eutectic alloy. The eutectic alloy can include lead and bismuth. Transferring heat to the heat transfer fluid can include heating the heat transfer fluid to about 1,500° C. After transferring heat to the furnace, the heat transfer fluid can be divided into the first portion of the heat transfer fluid and the second portion of the heat transfer fluid. A mass ratio of the first portion of the heat transfer fluid to the second portion of the heat transfer fluid can be about 3:1. The first water stream can be electrolyzed by an electrolytic cell. The method can include, after transferring heat to the working fluid, transferring heat from the first portion of the heat transfer fluid to the electrolytic cell to maintain an electrolysis operating temperature in the electrolytic cell in a range of from about 70° C. to about 850° C. Transferring heat to the reactor can include maintaining a thermochemical water splitting operating temperature in the reactor in a range of from about 250° C. to about 1,400° C. The method can include contacting an iron ore with the first hydrogen stream from the electrolytic cell, the second hydrogen stream from the reactor, or both to reduce the iron ore into iron. At least a portion of the metal housed in the furnace can be sourced from the iron produced by reduction of the iron ore. At least a portion of the oxidizing stream can be sourced from the first oxygen stream from the electrolytic cell, the second oxygen stream from the reactor, or both. The furnace can include a plurality of electrodes. The method can include generating, by the plurality of electrodes, an electric arc between the plurality of electrodes and the metal housed in the furnace to melt the metal when sufficient solar energy is unavailable for heating the heat transfer fluid to about 1,500° C.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

This disclosure describes utilizing solar energy for operating an electric arc furnace (EAF) to produce steel. The systems and methods disclosed include recovering and using residual heat to produce hydrogen. The hydrogen is produced by both thermochemical water splitting and electrolysis. In some implementations, at least a portion of the produced hydrogen is used to reduce iron ore for producing iron. The produce iron can, for example, be used to produce the steel in the EAF.

The subject matter described in this disclosure can be implemented in particular implementations, so as to realize one or more of the following advantages. The systems and methods described can be implemented to produce steel using sustainable and/or renewable energy, such as solar energy. The systems and methods described can be implemented to recover and utilize residual heat from the production of steel to generate electrical power and also to produce oxygen and hydrogen. The oxygen and hydrogen can be produced by water splitting (for example, by thermochemical water splitting and by electrolysis. The oxygen produced can be recycled and used in the steel production process. The hydrogen produced can be used to reduce iron ore into iron. The iron that has been produced by the reduction of iron ore can be used to produce steel. The systems and methods described implement process and heat integration to efficiently and environmentally produce steel.

Figure 1A:
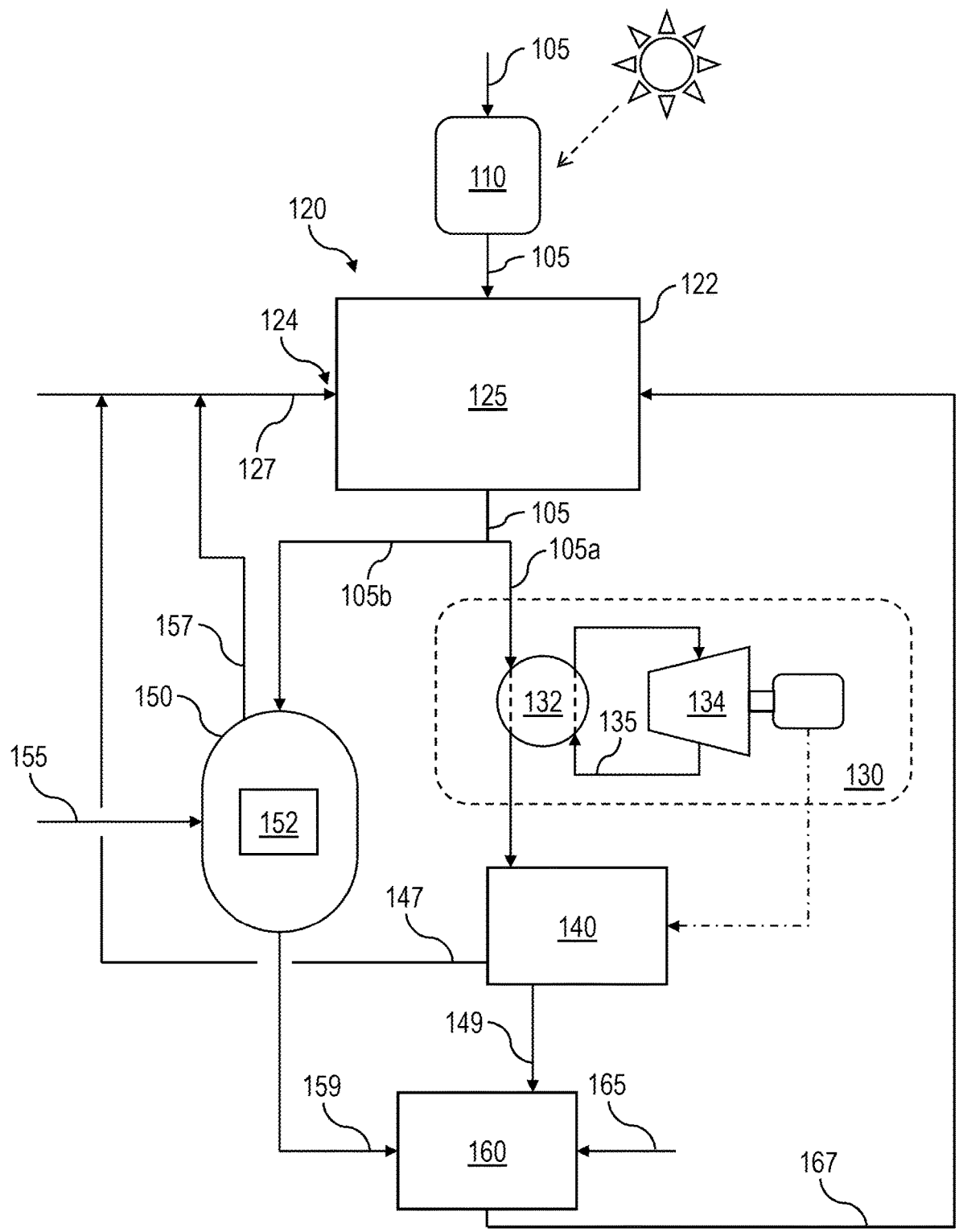
FIG. 1A is a schematic diagram of an example system for sustainably producing steel with co-generation of hydrogen.

FIG. 1A depicts an example system 100 for sustainably producing steel with co-generation of hydrogen. The system 100 includes a particle receiver 110, a furnace 120, a power generation unit 130, an electrolytic cell 140, and a reactor 150. The particle receiver 110 contains a heat transfer fluid 105. The heat transfer fluid 105 includes solid particles. In some implementations, the solid particles of the heat transfer fluid 105 is made of a eutectic alloy. For example, the solid particles of the heat transfer fluid 105 can be made of a eutectic alloy including lead and bismuth. The particle receiver 110 is configured to receive and concentrate solar energy. For example, the particle receiver 110 can include a heliostat with dual-axis tracking for receiving and concentrating solar energy. The particle receiver 110 is configured to transfer the concentrated solar energy to the heat transfer fluid 105 to heat the heat transfer fluid 105. In some implementations, the particle receiver 110 is configured to heat, via transfer of the concentrated solar energy, the heat transfer fluid 105 to a temperature in a range of from about 1,000 degrees Celsius (° C.) to about 2,000° C. For example, the particle receiver 110 can heat, via transfer of the concentrated solar energy, the heat transfer fluid 105 to a temperature of about 1,500° C. The heat transfer fluid 105 can flow from the particle receiver 110 to the furnace 120. In some implementations, the heat transfer fluid 105 has a mass flow rate in a range of from about 20 kilograms per second (kg/s) to about 30 kg/s.

The furnace 120 is coupled to the particle receiver 110. The furnace 120 includes a housing 122. The housing 122 is configured to receive and house a metal feedstock 125. The metal feedstock 125 comprises metal. For example, the metal feedstock 125 includes iron. As another example, the metal feedstock 125 includes scrap metal. The housing 122 is configured to transfer heat from the heat transfer fluid 105 to the metal feedstock 125 housed within the housing 122 to melt the metal. The heat transfer fluid 105 can transfer heat, for example, by conduction to the metal feedstock 125 housed within the housing 122 to melt the metal. In some implementations, the heat transfer fluid 105 flows through a pipe that passes through the housing 122. The metal feed stock 125 housed within the housing 122 can surround at least a portion of the pipe. As the heat transfer fluid 105 flows through the pipe, heat from the heat transfer fluid 105 can be transferred via conduction through the pipe wall to the surrounding metal feedstock 125 housed within the housing 122 to melt the metal. The housing 122 includes an inlet port 124. The inlet port 124 is configured to inject an oxidizing stream 127 into the housing 122 to oxidize at least a portion of the melted metal to form steel. The oxidizing stream 127 includes oxygen. In some implementations, the oxidizing stream 127 includes air. Once the steel has been formed, the steel can be removed from the housing 122 and be processed to be shipped. In some implementations, after the heat transfer fluid 105 has transferred heat to the furnace 120, the heat transfer fluid 105 has an operating temperature in a range of from about 1,000° C. to about 1,400° C. The heat transfer fluid 105 is then divided into a first portion 105a and a second portion 105b. The first portion 105a of the heat transfer fluid is flowed to the power generation unit 130. The second portion 105b of the heat transfer fluid is flowed to the reactor 150. In some implementations, a mass ratio of the first portion 105a to the second portion 105b is about 3:1. For example, the first portion 105a is about 75% of the heat transfer fluid 105, and the second portion 105b is about 25% of the heat transfer fluid 105. The mass ratio of the first portion 105a to the second portion 105b can be adjusted based on desired functionality of the system 100. For example, if it is more desirable to generate additional electrical power, more of the heat transfer fluid 105 can be distributed to the power generation unit 130.

The power generation unit 130 is downstream of the furnace 120. The power generation unit 130 is configured to receive the first portion 105a of the heat transfer fluid from the furnace 120. The power generation unit 130 includes a heat exchanger 132 and a turbine generator 134, which is in fluid communication with the heat exchanger 132. The first portion 105a of the heat transfer fluid flows to the heat exchanger 132. The heat exchanger 132 is configured to transfer heat from the first portion 105a of the heat transfer fluid to a working fluid 135. The working fluid 135 flows from the heat exchanger 132 to the turbine generator 134. The working fluid 135 flows through the turbine generator 134. The turbine generator 134 is configured to generate electrical power as the working fluid 135 expands through the turbine generator 134. The turbine generator 134 can include a turbine connected to a rotor that is surrounded by a stator. As the working fluid 135 flows across a turbine wheel of the turbine, the working fluid 135 expands and causes the turbine to rotate. The rotor rotates with the turbine, and the stator can convert the rotational energy of the rotor into electrical power. In some implementations, the working fluid 125 includes air, water (for example, steam), ammonia, or combinations thereof.

The electrolytic cell 140 is electrically coupled to the turbine generator 134. That is, the electrolytic cell 140 can receive and use power generated by the turbine generator 134. The electrolytic cell 140 is configured to receive a water stream 145. The electrolytic cell 140 is configured to utilize the electrical power generated by the turbine generator 134 to electrolyze the water stream 145 into an oxygen stream 147 and a hydrogen stream 149. In some implementations, the electrolytic cell 140 is configured to receive the first portion 105a of the heat transfer fluid from the heat exchanger 132. In such implementations, the electrolytic cell 140 can be configured to transfer heat from the first portion 105a of the heat transfer fluid to the water stream 145 to maintain an electrolysis operating temperature in the electrolytic cell 140 in a range of from about 70° C. to about 850° C. In some implementations, the electrolytic cell 140 is configured to generate the oxygen stream 147 at a rate of about 280 kilomoles per cubic meter of water entering the electrolytic cell 140 via the water stream 145. In some implementations, the electrolytic cell 140 is configured to generate the hydrogen stream 149 at a rate of about 560 kilomoles per cubic meter of water entering the electrolytic cell 140 via the water stream 145.

The electrolytic cell 140 can be, for example, a polymer electrolyte membrane (PEM) electrolytic cell, an alkaline water electrolytic cell, a solid oxide electrolytic cell, or an anion exchange membrane (AEM) electrolytic cell. The electrolytic cell 140 includes electrodes. Using the power generated by the turbine generator 134, the electrolytic cell 140 applies a voltage across the electrodes to drive the two half reactions shown in Equations 1 and 2 to electrolyze water and produce oxygen and hydrogen.

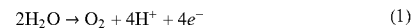

$$2H_2O \rightarrow O_2 + 4H^+ + 4e^- \quad (1)$$

$$4H^+ + 4e^- \rightarrow 2H_2 \quad (2)$$

In cases in which the electrolytic cell 140 is a PEM electrolytic cell, the open circuit voltage of the operating electrolytic cell 140 can be in a range of from about 1.2 volts (V) to about 2.5 V. In some implementations, the operating temperature of the electrolytic cell 140 is in a range of from about 50 degrees Celsius (° C.) to about 80° C. In some implementations, the operating pressure of the electrolytic cell 140 is less than about 70 bar. In some implementations, the electric current density of the power provided to the electrolytic cell 140 is in a range of from about 1 amperes per square centimeter (A/cm$^2$) to about 6 A/cm$^2$.

In cases in which the electrolytic cell 140 is an alkaline water electrolytic cell, the open circuit voltage of the operating electrolytic cell 140 can be in a range of from about 1.2 V to about 3 V. In some implementations, the operating temperature of the electrolytic cell 140 is in a range of from about 70° C. to about 90° C. In some implementations, the operating pressure of the electrolytic cell 140 is less than about 70 bar. In some implementations, the electric current density of the power provided to the electrolytic cell 140 is in a range of from about 0.2 A/cm$^2$ to about 6 A/cm$^2$.

In cases in which the electrolytic cell 140 is a solid oxide electrolytic cell, the open circuit voltage of the operating electrolytic cell 140 can be in a range of from about 1 V to about 1.5 V. In some implementations, the operating temperature of the electrolytic cell 140 is in a range of from about 700° C. to about 850° C. In some implementations, the operating pressure of the electrolytic cell 140 is less than about 30 bar. In some implementations, the electric current density of the power provided to the electrolytic cell 140 is in a range of from about 0.3 A/cm$^2$ to about 6 A/cm$^2$.

In cases in which the electrolytic cell 140 is an AEM electrolytic cell, the open circuit voltage of the operating electrolytic cell 140 can be in a range of from about 1.2 V to about 2 V. In some implementations, the operating temperature of the electrolytic cell 140 is in a range of from about 40° C. to about 80° C. In some implementations, the operating pressure of the electrolytic cell 140 is less than about 70 bar. In some implementations, the electric current density of the power provided to the electrolytic cell 140 is in a range of from about 0.2 A/cm$^2$ to about 6 A/cm$^2$.

In some implementations, at least a portion of the oxygen stream 147 produced by the electrolytic cell 140 is flowed to the furnace 120 to oxidize at least a portion of the melted metal in the furnace 120 to form steel. For example, at least a portion of the oxidizing stream 127 can be sourced from the oxygen stream 147. As another example, at least a portion of the oxygen stream 147 can be mixed with the oxidizing stream 127 to be flowed together into the furnace 120. As another example, the oxidizing stream 127 and the oxygen stream 147 can be separately flowed into the furnace 120.

The reactor 150 is downstream of the furnace 120. The reactor 150 includes a recycling agent 152. The recycling agent 152 is a recycling agent that can be used to cycle through various chemical reactions of a thermochemical cycle to split water into oxygen and hydrogen. For example, the recycling agent 152 can include sulfur (S), iodine (I), copper (Cu), iron (Fe), magnesium (Mg), zinc (Zn), or combinations of these. Some examples of thermochemical cycles for water splitting include sulfur-iodine (S—I) cycle, copper-chlorine (Cu—Cl) cycle, iron-chlorine (Fe—Cl) cycle, magnesium-chlorine (Mg—Cl) cycle, zinc (Zn) cycle, zinc oxide (ZnO) cycle, zinc iodide ($ZnI_2$) cycle, and zinc-sulfur-iodine (Zn—S—I) cycle. The reactor 150 is configured to receive the second portion 105b of the heat transfer fluid from the furnace 120. The reactor 150 is configure to receive a water stream 155. The reactor 150 is configured to transfer heat from the second portion 105b of the heat transfer fluid to the recycling agent 152 and the water stream 155 to thermochemically split the water stream 155 into an oxygen stream 157 and a hydrogen stream 159. In some implementations, the reactor 150 is configured to transfer heat from the second portion 105b of the heat transfer fluid to the recycling agent 152 and the water stream 155 to maintain thermochemical water splitting operating temperature in the reactor 150 in a range of from about 250° C. to about 1,400° C.

In some implementations, at least a portion of the oxygen stream 157 produced by the reactor 150 is flowed to the furnace 120 to oxidize at least a portion of the melted metal in the furnace 120 to form steel. For example, at least a portion of the oxidizing stream 127 can be sourced from the oxygen stream 157. As another example, at least a portion of the oxygen stream 157 can be mixed with the oxidizing stream 127 to be flowed together into the furnace 120. As another example, the oxidizing stream 127 and the oxygen stream 157 can be separately flowed into the furnace 120.

In some implementations, the first portion 105a of the heat transfer fluid flows from the heat exchanger 132 back to the particle receiver 110 to be reheated (by solar energy) and recirculated through the system 100 to continue to provide heat to produce steel (via the furnace 120), produce electricity (via the turbine generator 134), and produce hydrogen (via the electrolytic cell 140 and the reactor 150). In implementations in which the first portion 105a of the heat transfer fluid is used to heat the electrolytic cell 140, the first portion 105a of the heat transfer fluid can flow from the electrolytic cell 140 back to the particle receiver 110 to be reheated and recirculated through the system 100. In some implementations, the second portion 105b of the heat transfer fluid flows from the reactor 150 back to the particle receiver 110 to be reheated and recirculated through the system 100. In some implementations, the first portion 105a and the second portion 105b of the heat transfer fluid re-combine before flowing back to the particle receiver 110 to be reheated and recirculated through the system 100.

In some implementations, the system 100 includes a direct reduced iron (DRI) production unit 160. The DRI production unit 160 can be configured to receive at least a portion of the hydrogen stream 149 from the electrolytic cell 140, at least a portion of the hydrogen stream 159 from the reactor 150, or both. The DRI production unit 160 can be configured to receive iron ore 165. The DRI production unit 160 can be configured to contact the iron ore 165 with at least a portion of the hydrogen stream 149 from the electrolytic cell 140, at least a portion of the hydrogen stream 159 from the reactor 150, or both to reduce the iron ore 165 into iron 167. The iron 167 can be provided to the furnace 120 to produce steel. For example, at least a portion of the metal feedstock 125 can be sourced from the iron 167 produced by the DRI production unit 160. As another example, the iron 167 can be provided to the furnace 120 in addition to the metal feedstock 125 to produce steel.

Figure 1B:
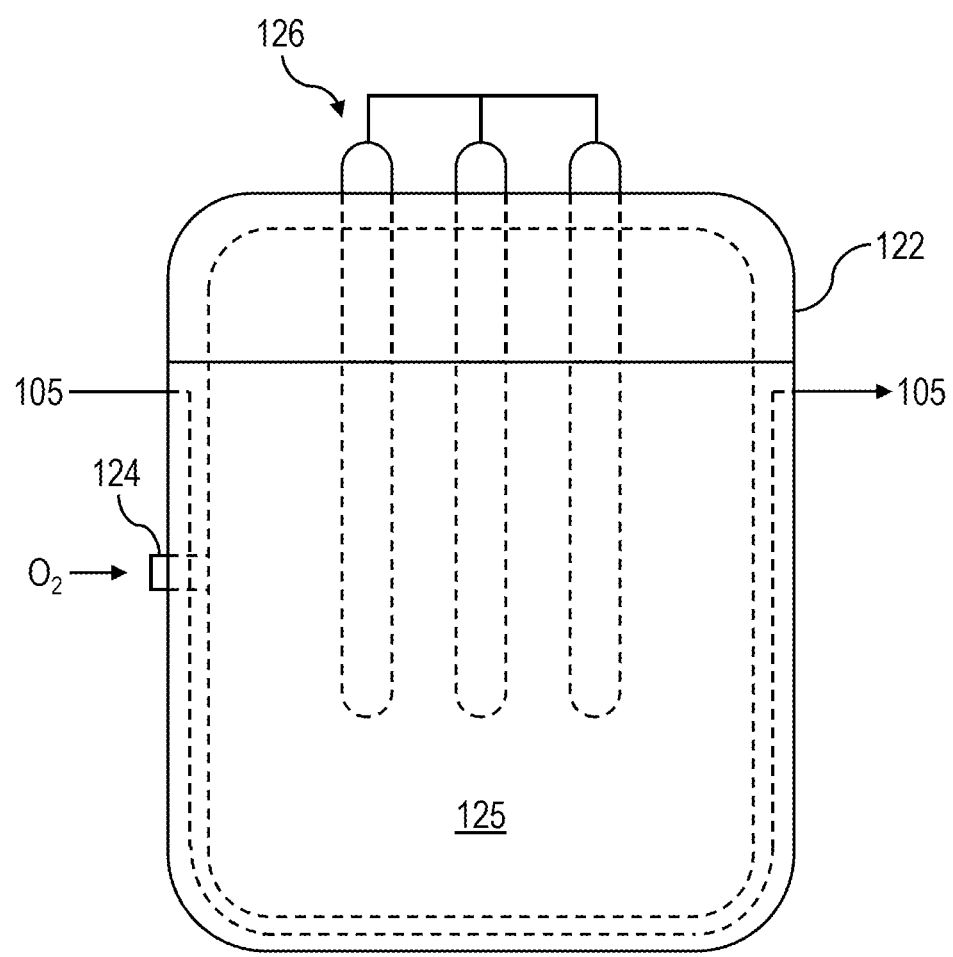
FIG. 1B is a schematic diagram of an example furnace that can be implemented in the system of FIG. 1A.

FIG. 1B depicts an implementation of the furnace 120. As described previously, the furnace 120 includes the housing 122. The housing 122 includes the inlet port 124 configured to inject oxygen into the housing 122. In some implementations, as shown in FIG. 1B, the furnace 120 includes electrodes 126. The electrodes 126 can be coupled to the housing 122. A voltage can be applied across the electrodes 126 to generate an electric arc between the electrodes 126 and the metal feedstock 125 within the housing 122 to melt the metal feedstock 125. The electrodes 126 can, for example, be used in conjunction with or alternative to the heat transfer fluid 105 to provide the necessary heat to melt the metal feedstock 125 within the housing 122 for producing steel. Generating the electric arc via the electrodes 126 can be energy intensive. In order to save energy usage, the heat transfer fluid 105 can be used to provide heat to the furnace 120 at times when there is sufficient solar energy available (for example, during the day) to melt the metal feedstock 125 within the housing 122 for producing steel, and the electrodes 126 can be used to generate the electric arc to provide heat to the furnace 120 at times when there is insufficient solar energy available (for example, during the night or during a storm) to melt the metal feedstock 125 within the housing 122 for producing steel. Incorporation of the electrodes 126 can provide flexibility, especially in time periods where sufficient solar energy may not be available. However, it can be advantageous to rely on the heat transfer fluid 105 (which is heated via solar energy) as much as possible to reduce energy usage and optimize efficiency.

Figure 2:
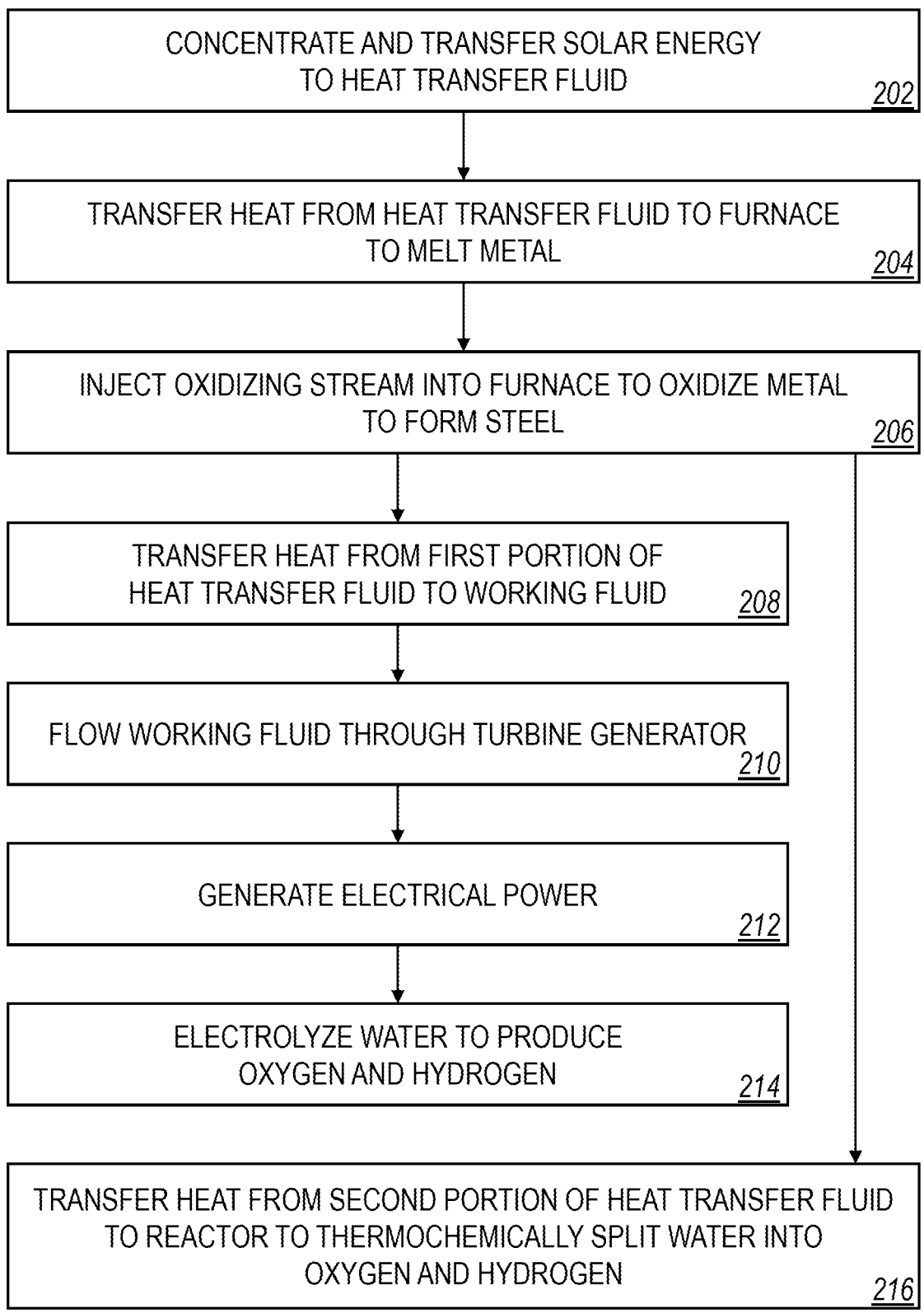
FIG. 2 is a flow chart of an example method for sustainably producing steel with co-generation of hydrogen.

FIG. 2 is a flow chart of an example method 200 for sustainably producing steel with co-generation of hydrogen. The system 100 can, for example, implement the method 200. At block 202, solar energy is concentrated and transferred to a heat transfer fluid (such as the heat transfer fluid 105). Concentrating and transferring the solar energy to the heat transfer fluid 105 at block 202 heats the heat transfer fluid 105. Concentrating and transferring the solar energy to the heat transfer fluid 105 at block 202 can be implemented, for example, by the particle receiver 110. In some implementations, the heat transfer fluid 105 is heated to about 1,500° C. at block 202. After transferring the solar energy to the heat transfer fluid 105 at block 202, heat is transferred from the heat transfer fluid 105 to a furnace (such as the furnace 120) at block 204. The furnace 120 houses metal (for example, iron). The metal housed within the furnace 120 can be, for example, the metal feedstock 125. Transferring the heat from the heat transfer fluid 105 to the furnace 120 at block 204 melts the metal housed within the furnace 120. While heat is transferred to the furnace 120 at block 204, an oxidizing stream (such as the oxidizing stream 127) is injected into the furnace 120 at block 206. Injecting the oxidizing stream 127 into the furnace 120 at block 206 causes at least a portion of the melted metal housed within the furnace 120 to oxidize to form steel. After heat is transferred to the furnace 120 at block 204, the heat transfer fluid 105 can be divided into a first portion (such as the first portion 105a) and a second portion (such as the second portion 105b). At block 208, heat is transferred from the first portion 105a of the heat transfer fluid to a working fluid (such as the working fluid 135). Transferring the heat from the first portion 105a of the heat transfer fluid to the working fluid 135 at block 208 can be implemented, for example, by the heat exchanger 132 of the power generation unit 130. After heat is transferred to the working fluid 135 at block 208, the working fluid 135 is flowed through a turbine generator (such as the turbine generator 134) at block 210. At block 212, the turbine generator 134 generates electrical power in response to the working fluid 135 flowing through the turbine generator 134 at block 210. At block 214, a first water stream (such as the water stream 145) is electrolyzed using the electrical power generated by the turbine generator 134 (block 212) to produce a first oxygen stream (such as the oxygen stream 147) and a first hydrogen stream (such as the hydrogen stream 149). Electrolyzing the water stream 145 at block 214 can be implemented, for example, by the electrolytic cell 140. In some implementations, after heat is transferred to the working fluid 135 at block 208, heat is transferred from the first portion 105a of the heat transfer fluid to the electrolytic cell 140 to maintain an electrolysis operating temperature in the electrolytic cell in a range of from about 70° C. to about 850° C. At block 216, heat is transferred from the second portion 105a of the heat transfer fluid to a reactor (such as the reactor 150). The reactor 150 houses a recycling agent 152. Transferring heat to the reactor 150 at block 216 thermochemically splits a second water stream (such as the water stream 155) into a second oxygen stream (such as the oxygen stream 157) and a second hydrogen stream (such as the hydrogen stream 159). In some implementations, the reactor 150 is heated (via the second portion 105b of the heat transfer fluid) to maintain a thermochemical water splitting operating temperature in the reactor in a range of from about 250° C. to about 1,400° C. at block 216. In some implementations, the method 200 includes contacting iron ore (such as the iron ore 165) with the hydrogen stream 149 from the electrolytic cell 140, the hydrogen stream 159 from the reactor 150, or both to reduce the iron ore 165 into iron 167. The reduction of the iron ore 165 can be implemented, for example, by the DRI production unit 160. In some implementations, at least a portion of the metal housed in the furnace 120 (block 204) is sourced from the iron 167 produced by reduction of the iron ore 165. In some implementations, at least a portion of the oxidizing stream 127 injected into the furnace 120 (block 206) is sourced from the oxygen stream 147 from the electrolytic cell 140, the oxygen stream 157 from the reactor 150, or both. In some implementations, the method 200 includes generating, by electrodes (such as the electrodes 126), an electric arc between the electrodes 126 and the metal housed in the furnace 120 to melt the metal when sufficient solar energy is unavailable for heating the heat transfer fluid 105 to about 1,500° C. at block 202.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A system comprising:
a particle receiver containing a heat transfer fluid comprising a plurality of solid particles, the particle receiver configured to receive and concentrate solar energy and transfer the concentrated solar energy to the heat transfer fluid to heat the heat transfer fluid;

a furnace coupled to the particle receiver, the furnace comprising a housing configured to receive a metal feedstock comprising metal, the housing configured to transfer heat from the heat transfer fluid to the metal feedstock to melt the metal, the housing comprising an inlet port configured to inject an oxidizing stream comprising oxygen into the housing to oxidize at least a portion of the melted metal to form steel;

a power generation unit downstream of the furnace, the power generation unit configured to receive a first portion of the heat transfer fluid from the furnace, the power generation unit comprising:
- a heat exchanger configured to transfer heat from the first portion of the heat transfer fluid to a working fluid; and
- a turbine generator in fluid communication with the heat exchanger, the turbine generator configured to receive the working fluid that has been heated by the heat exchanger, the turbine generator configured to generate electrical power as the working fluid expands through the turbine generator;

an electrolytic cell electrically coupled to the turbine generator, the electrolytic cell configured to receive a first water stream, the electrolytic cell configured to utilize the electrical power generated by the turbine generator to electrolyze the first water stream into a first oxygen stream and a first hydrogen stream; and a reactor downstream of the furnace, the reactor comprising a recycling agent, the reactor configured to receive a second portion of the heat transfer fluid from the furnace, the reactor configured to receive a second water stream, the reactor configured to transfer heat from the second portion of the heat transfer fluid to the recycling agent and the second water stream to thermochemically split the second water stream into a second oxygen stream and a second hydrogen stream.

2. The system of claim 1, wherein the plurality of solid particles of the heat transfer fluid are made of a eutectic alloy comprising lead and bismuth, and the particle receiver is configured to transfer the concentrated solar energy to the heat transfer fluid to heat the heat transfer fluid to about 1,500 degrees Celsius (° C.).

3. The system of claim 2, wherein a mass ratio of the first portion of the heat transfer fluid to the second portion of the heat transfer fluid is about 3:1.

4. The system of claim 3, wherein the electrolytic cell is configured to receive the first portion of the heat transfer fluid from the heat exchanger, and the electrolytic cell is configured to transfer heat from the first portion of the heat transfer fluid to the first water stream to maintain an electrolysis operating temperature in the electrolytic cell in a range of from about 70° C. to about 850° C.

5. The system of claim 4, wherein the reactor is configured to transfer heat from the second portion of the heat transfer fluid to the recycling agent and the second water stream to maintain a thermochemical water splitting operating temperature in the reactor in a range of from about 250° C. to about 1,400° C.

6. The system of claim 5, comprising a direct reduced iron production unit configured to receive as a hydrogen source the first hydrogen stream from the electrolytic cell, the second hydrogen stream from the reactor, or both, the direct reduced iron production unit configured to contact iron ore with the hydrogen source to reduce the iron ore into iron.

7. The system of claim 6, wherein at least a portion of the metal feedstock is sourced from the iron produced by the direct reduced iron production unit.

8. The system of claim 7, wherein at least a portion of the oxidizing stream is sourced from the first oxygen stream from the electrolytic cell, the second oxygen stream from the reactor, or both.

9. The system of claim 8, wherein the furnace comprises a plurality of electrodes configured to generate an electric arc between the plurality of electrodes and the metal feedstock within the housing to melt the metal feedstock when sufficient solar energy is unavailable for heating the heat transfer fluid to about 1,500° C.

10. A method comprising:
concentrating and transferring solar energy to a heat transfer fluid, thereby heating the heat transfer fluid, wherein the heat transfer fluid comprises a plurality of solid particles;
after transferring solar energy to the heat transfer fluid, transferring heat from the heat transfer fluid to a furnace that houses metal to melt the metal;
while transferring heat to the furnace, injecting an oxidizing stream comprising oxygen into the furnace to oxidize at least a portion of the melted metal to form steel;
after transferring heat to the furnace, transferring heat from a first portion of the heat transfer fluid to a working fluid;
after transferring heat to the working fluid, flowing the working fluid through a turbine generator;
generating, by the turbine generator, electrical power in response to the working fluid flowing through the turbine generator;
electrolyzing a first water stream using the electrical power generated by the turbine generator to produce a first oxygen stream and a first hydrogen stream; and
after transferring heat to the furnace, transferring heat from a second portion of the heat transfer fluid to a reactor that houses a recycling agent to thermochemically split a second water stream into a second oxygen stream and a second hydrogen stream.

11. The method of claim 10, wherein the plurality of solid particles of the heat transfer fluid are made of a eutectic alloy comprising lead and bismuth, and transferring heat to the heat transfer fluid comprises heating the heat transfer fluid to about 1,500 degrees Celsius (° C.).

12. The method of claim 11, comprising, after transferring heat to the furnace, dividing the heat transfer fluid into the first portion of the heat transfer fluid and the second portion of the heat transfer fluid, wherein a mass ratio of the first portion of the heat transfer fluid to the second portion of the heat transfer fluid is about 3:1.

13. The method of claim 12, wherein the first water stream is electrolyzed by an electrolytic cell, and the method comprises, after transferring heat to the working fluid, transferring heat from the first portion of the heat transfer fluid to the electrolytic cell to maintain an electrolysis operating temperature in the electrolytic cell in a range of from about 70° C. to about 850° C.

14. The method of claim 13, wherein transferring heat to the reactor comprises maintaining a thermochemical water splitting operating temperature in the reactor in a range of from about 250° C. to about 1,400° C.

15. The method of claim 14, comprising contacting an iron ore with the first hydrogen stream from the electrolytic cell, the second hydrogen stream from the reactor, or both to reduce the iron ore into iron.

16. The method of claim 15, wherein at least a portion of the metal housed in the furnace is sourced from the iron produced by reduction of the iron ore.

17. The method of claim 16, wherein at least a portion of the oxidizing stream is sourced from the first oxygen stream from the electrolytic cell, the second oxygen stream from the reactor, or both.

18. The method of claim 17, wherein the furnace comprises a plurality of electrodes, and the method comprises generating, by the plurality of electrodes, an electric arc between the plurality of electrodes and the metal housed in the furnace to melt the metal when sufficient solar energy is unavailable for heating the heat transfer fluid to about 1,500° C.

* * * * *